April 16, 1968  A. I. W. FRANK  3,378,245
APPARATUS FOR CONTROLLABLY EXPANDING EXPANDABLE MATERIAL Filed Feb. 14, 1966

INVENTOR
Alan I W Frank

United States Patent Office 3,378,245
Patented Apr. 16, 1968

3,378,245
APPARATUS FOR CONTROLLABLY EXPANDING
EXPANDABLE MATERIAL
Alan I. W. Frank, Pittsburgh, Pa., assignor to The Alan
I W Frank Corporation, Pittsburgh, Pa., a corporation
of Pennsylvania
Filed Feb. 14, 1966, Ser. No. 527,178
5 Claims. (Cl. 263—21)

ABSTRACT OF THE DISCLOSURE

Apparatus for controllably expanding expandable material comprising an expander through which the material passes, means for introducing an expanding medium consisting of a mixture of steam and air into the expander, said means including an air valve, means for determining the bulk density of the expanded material and means actuated by changes in the bulk density of the expanded material for adjusting the air valve to alter the proportion of air in the mixture to control the temperature of the expanding medium to produce expanded material of desired bulk density. The apparatus may comprise a container, a source of expanding medium, means for introducing into the container material to be controllably expanded, means for delivering expanded material from the container, means for introducing expanding medium into the container at a location between the location of introduction of material into the container and the location of the means for delivering expanded material from the container, means for controlling the temperature of the expanding medium introduced into the container at a location between the location of introduction of material into the container and the location of the means for delivering expanded material from the container, means for determining the bulk density of the expanded material and means actuated by changes in the bulk density of the expanded material for controlling the temperature of the expanding medium introduced into the container at a location between the location of introduction of material into the container and the location of the means for delivering expanded material from the container.

---

Figure 1:
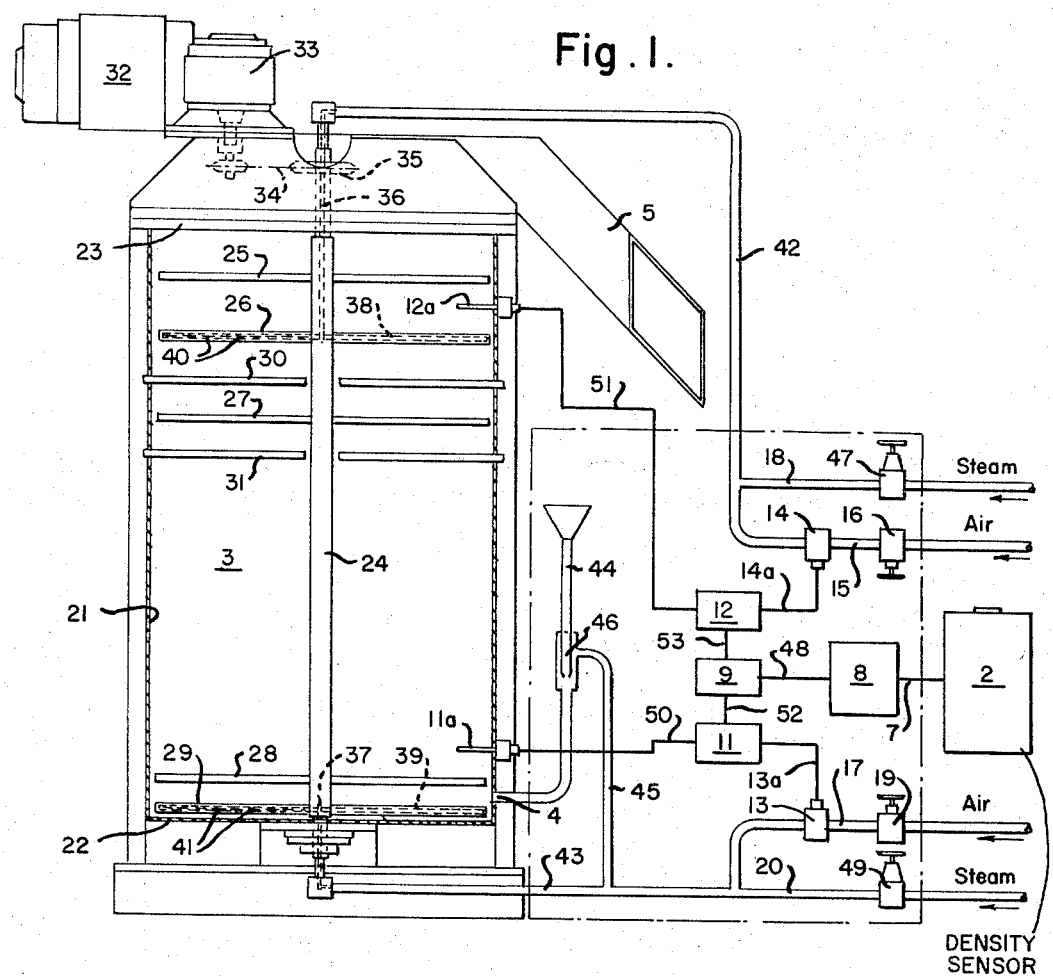

The present invention relates to the art of controllably expanding expandable material. While the invention has wide application in relation to the material being controllably expanded, it has important practical utility in the controlled expanding of particles or beads of a synthetic thermoplastic substance, such, for example, as expandable polystyrene beads, impregnated with a gas which under the application of heat causes the particles or beads to expand. For purposes of explanation and illustration I shall describe the invention as employed in the controlled expansion of expandable polystyrene beads impregnated with a gas which under the application of heat causes the beads to expand.

Expandable polystyrene beads are employed for making a variety of products of which a typical example is drinking cups having the property of high thermal insulation. The beads are first expanded to a desired extent and the expanded beads are introduced into a mold where they are subjected to heat to produce a cup or other product.

The extent to which the expandable polystyrene beads are expanded depends upon the temperature to which the beads are subjected. The bulk density of the expanded beads decreases as the temperature applied increases. For uniformity and quality of the ultimate product it is desirable that the extent of expansion be closely controlled so that the bulk density of the expanded beads is maintained at a predetermined optimum value.

Heretofore one method of expanding polystyrene beads impregnated with gas which under the application of heat causes the beads to expand has been to inject the impregnated beads into an expander comprising a container by an air and steam mixture. The air and steam mixture in addition to acting as an injecting agent to inject the beads into the expander also acted as a heating agent to heat the beads in the expander. The beads while being heated by the air and steam mixture were agitated or stirred. The process was either continuous, the beads being fed into the container at one end and delivered from the container at the opposite end or conducted as a batch operation. The expanded beads were delivered to a molding station where they were molded into cups or other products.

As above indicated, the bulk density of the expanded beads decreases as the temperature of the air and steam mixture to which the beads are subjected increases. Variations in the uniformity or quality of the ultimate product may be due to variations in the extent of expansion of the beads which in turn may be attributable to undesired variation in the temperature of the air and steam mixture introduced into the expander. Attempts have been made to remedy the situation but no fully satisfactory solution to the problem was found prior to my invention. Accurate adjustments, as of the temperature of the air and steam mixture have been difficult to achieve and the time interval between the discovery of need for adjustment and the accomplishment of effective adjustment has been undesirably great. The quality and uniformity of the cups or other ultimate products have suffered as a result.

I have made an improvement in the art of controllably expanding expandable material which has for the first time effectively solved the problems above referred to. With specific reference to the expanding of impregnated polystyrene beads, I have reduced almost to the point of elimination variation in the bulk density of the expanded beads. I have similarly reduced the time interval between the discovery of need for adjustment and accomplishment of effective adjustment.

I provide apparatus for controllably expanding expandable material comprising an expander through which the material passes, means for introducing an expanding medium into the expander, means for determining the bulk density of the expanded material and means actuated by changes in the bulk density of the expanded material for controlling the temperature of the expanding medium to produce expanded material of desired bulk density. The expanding medium may consist of a mixture of steam and air. The means actuated by changes in the bulk density of the expanded material may adjust the relative quantities of steam and air in the mixture to control the temperature of the expanding medium. The adjustment may be effected by air valve means to alter the proportion of air in the mixture of steam and air.

The means for determining the bulk density of the expanded material may be as disclosed in copending application Ser. No. 530,977, filed Mar. 1, 1966. Such means may automatically take samples of the expanded material and weigh such samples whereby the bulk density of the material is measured, and means may be provided actuated automatically by the weighing means for controlling the temperature of the expanding medium.

My expander may comprise a container together with means for feeding material to be controllably expanded into the container, means for delivering expanded material from the container and a movable agitator in the container agitating the material while it is being expanded, the agitator having a portion constituting a conduit receiving expanding medium from an expanding medium supply and delivering the expanding medium to the interior of the container in intimate contact with the material during movement of the agitator. The agitator may be rotatable and may have one or more hollow elements with openings communicating with the interior of the container receiving expanding medium from the expanding medium supply and delivering the expanding medium to the interior of the container in intimate contact with the material during rotation of the agitator. The hollow element or hollow elements is or are preferably disposed in the region of the means for delivering expanded material from the container for a purpose to be presently described. Preferably the expanding medium is delivered from the source thereof into the container at a location closer to the means for delivering expanded material from the container than to the means for feeding into the container material to be controllably expanded.

In a preferred form my expander comprises a container, a source of expanding medium, means for introducing into the container material to be controllably expanded, means for delivering expanded material from the container, means for introducing expanding medium into the container at a location between the location of introduction of material into the container and the location of the means for delivering expanded material from the container and means for controlling the temperature of the expanding medium introduced into the container at a location between the location of introduction of material into the container and the location of the means for delivering expanded material from the container.

As above indicated, I preferably provide means for determining the bulk density of the expanded material together with means actuated by changes in the bulk density of the expanded material for controlling the temperature of the expanding medium introduced into the container at a location between the location of introduction of material into the container and the location of the means for delivering expanded material from the container.

I desirably employ a movable agitator in the container agitating the material while it is being expanded, the agitator having a portion constituting a conduit through which expanding medium is introduced into the container at a location between the location of introduction of material into the container and the location of the means for delivering expanded material from the container. I also desirably provide means for introducing expanding medium separate from the material into the container at a location in the region of the location in which the material is introduced into the container.

In combination with the means for determining the bulk density of the expanded material first means may be provided actuated by changes in the bulk density of the expanded material for controlling the temperature of the expanding medium introduced into the container at a location between the location of introduction of material into the container and the location of the means for delivering expanded material from the container together with second means actuated by changes in the bulk density of the expanded material for controlling the temperature of the expanding medium introduced into the container at a location in the region of the location in which the material is introduced into the container. The first and second means are desirably constructed and arranged to maintain a predetermined differential between the temperatures controlled thereby. Additionally connections may be provided from the source of expanding medium for injecting into the container by the expanding medium the material to be controllably expanded.

Other details, objects and advantages of the invention will become apparent as the following description of a present preferred embodiment thereof proceeds.

Figure 2:
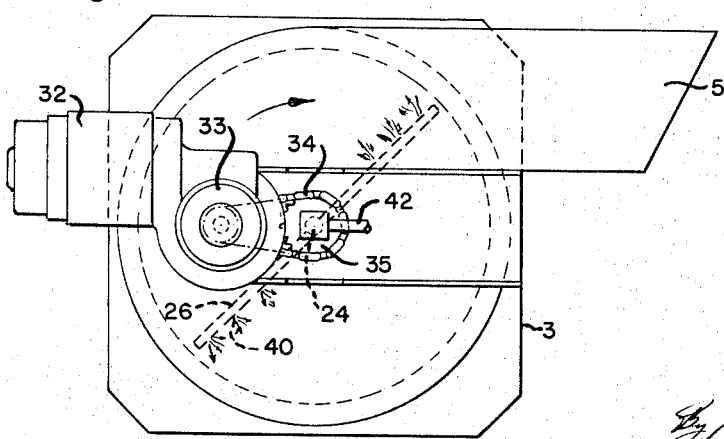

In the accompanying drawings I have shown a present preferred embodiment of the invention in which:

FIGURE 1 is an elevational view, partly in central vertical cross section, and showing more or less diagrammatically a control panel, of an expander made in accordance with my invention; and FIGURE 2 is a top plan view of the expander shown in FIGURE 1, omitting the control panel.

Referring now more particularly to the drawings, there is indicated generally by reference numeral 2 mechanism for automatically periodically taking and weighing fixed volume samples of expanded material which is to be delivered to a molding station and molded into cups or other products. The material is expanded in an expander designated generally by reference numeral 3. The impregnated beads are introduced into the expander 3 adjacent the bottom thereof at 4 and in the expander are subjected to heat and expand to a desired extent and discharged through the chute 5. The movement of the beads through the expander may be either continuous or by batches. For illustrative purposes continuous movement of the beads through the expander will be described. The beads fall from the chute 5 into a receptacle whence they are delivered to a molding station to be molded into cups or other products. The mechanism 2 automatically periodically takes fixed volume samples of the expanded beads issuing from the chute 5 and weighs the beads as described in said copending application. The mechanism 2 creates differing electrical impulses reflecting the weights of samples, which impulses are conducted through a cable 7 to an intermediate control unit 8. The intermediate control unit 8 contains four relays. The electrical connections between the mechanism 2 and the unit 8 through the cable 7 are such that if the weight of the sample being weighed in the mechanism 2 is exactly or substantially exactly the weight desired the impulse transmitted to the unit 8 from the mechanism 2 does not excite the unit 8. If the weight of the sample is lighter than desired within a certain range the impulse transmitted to the unit 8 from the mechanism 2 causes a first one of the relays in the unit 8 to be actuated. If the weight of the sample is lighter than desired beyond said range the impulse transmitted to the unit 8 from the mechanism 2 causes a second relay in the unit 8 to be actuated. If the weight of the sample is heavier than desired within a certain range the impulse transmitted to the unit 8 from the mechanism 2 causes a third relay in the unit 8 to be actuated. If the weight of the sample is heavier than desired beyond said range the impulse transmitted to the unit 8 from the mechanism 2 causes a fourth relay in the unit 8 to be actuated.

An air compressor (not shown) is provided which delivers compressed air through air pressure regulators 16 and 19 respectively to pipes 15 and 17. A steam boiler (not shown) is provided which delivers steam under pressure through steam pressure regulators 47 and 49 respectively to pipes 18 and 20.

Referring now to the expander 3, it consists of a generally cylindrical upright shell 21 closed at the bottom by a base 22 and at the top by a cap 23. Disposed axially of the shell 21 and journaled for rotation therein is a vertical shaft 4. Fixed to the shaft 24 are generally horizontally extending arms 25, 26, 27, 28 and 29. Other rotating arms are provided between the arms 27 and 28 which are not shown in FIGURE 1. Stationary arms are provided in the shell. Two such arms are shown at 30 and 31. Other stationary arms which are not shown may be provided. Stationary and rotating arms may be interspersed axially of the shaft 24. The shaft 24 is rotated by an electric motor 32 operating through reduction gearing 33 driving a sprocket chain 34 which meshes with a sprocket 35 fixed to the shaft 24.

The arms 25, 27 and 28 act simply as stirrers. The arms 26 and 29 act as stirrers and also as means to introduce expanding medium into the expander into intimate contact with the beads being expanded and laying blankets of expanding medium across the full area of the expander. The upper portion of the shaft 24 is drilled to provide an axial passage 36 therein and the lower portion of the shaft 24 is drilled to provide an axial passage 37 therein. Expanding medium enters through each of the axial passages as will be presently described and passes into bores in the arms 26 and 29 and out of the bores into the expander through slots or openings in the trailing edges of the arms. The bore in the arm 26 is shown at 38 and that in the arm 29 is shown at 39. The slots through which the expanding medium passes out of the arm 26 into the expander are shown at 40 and the slots through which the expanding medium passes out of the arm 29 into the expander are shown at 41. The arm 26 is in the region of the upper end of the expander where the expanded beads are delivered through the chute 5. The arm 29 is in the region of the location where the beads to be expanded are introduced into the expander, i.e., adjacent the bottom thereof.

The control of the temperature of the expanding medium, i.e., the mixture of steam and air, introduced into the expander through the arms 26 and 29 is effected by the mechanism 2, the unit 8 and the further mechanism now to be described. A valve 14 controls the quantity of air introduced through the pipe 15 to mix with steam entering through the pipe 18. A valve 13 controls the quantity of air introduced through the pipe 17 to mix with steam entering through the pipe 20. The mixture entering the top of the expander passes through a pipe 42 into the bore 36. The mixture entering the bottom of the expander passes through a pipe 43 into the bore 37.

The expander is provided with two temperature sensing devices, one in the region of the arm 26 and one in the region of the arm 29. The upper temperature sensing device in the region of the arm 26 is designated 12a and the lower temperature sensing device in the region of the arm 29 is designated 11a.

Reference numeral 11 designates a temperature controller electrically connected with the valve 13 by means 13a whose function is to control the opening of the valve 13 to control the quantity of air flowing therethrough to be mixed with steam in the pipe 43 to maintain in the region of the arm 29 a temperature for which the temperature controller is preset. Reference numeral 12 designates a temperature controller electrically connected with the valve 14 by means 14a whose function is to control the opening of the valve 14 to control the quantity of air flowing therethrough to be mixed with steam in the pipe 42 to maintain in the region of the arm 26 a temperature for which the temperature controller is preset. The settings of the temperature controllers 11 and 12 are such that a predetermined temperature differential is maintained between the upper portion of the expander in the region of the arm 26 and the lower portion of the expander in the region of the arm 29, the temperature at the upper portion of the expander being higher by perhaps a degree or two than the temperature at the lower portion of the expander. The temperature sensing devices 11a and 12a act in the nature of thermostats and are electrically connected with the temperature controllers 11 and 12 by conductors 50 and 51 respectively. If one of the temperature sensing devices senses a temperature lower than the temperature for which the corresponding temperature controller 11 or 12 is set that temperature controller alters the flow of air through the valve 13 or the valve 14 as the case may be, either increasing such flow if the sensed temperature is higher than that for which the temperature controller is set or decreasing such flow if the sensed temperature is lower than that for which the temperature controller is set.

The four relays of the unit 8 are electrically connected through a cable 48 with a temperature reset device 9 effective to reset the temperature controllers 11 and 12. If the relay in the unit 8 first mentioned above is actuated it closes a circuit in the device 9, which is electrically connected with the temperature controllers 11 and 12 by conductors 52 and 53 respectively, reducing by a predetermined amount the settings of the temperature controllers 11 and 12. If the second mentioned relay is actuated it closes a circuit in the device 9 reducing by a predetermined amount somewhat greater than the first mentioned predetermined amount the settings of the temperature controllers 11 and 12. If the third mentioned relay is actuated it closes a circuit in the device 9 increasing by a predetermined amount the settings of the temperature controllers 11 and 12. If the fourth mentioned relay is actuated it closes a circuit in the device 9 increasing by a predetermined amount somewhat greater than the first mentioned predetermined amount the settings of the temperature controllers 11 and 12.

Initial temperature control is effected in the lower portion of the expander where the beads are introduced and fine control is effected in the upper portion of the expander near where the expanded beads pass out of the expander.

Heretofore when the only mixture of steam and air admitted to the expander was the mixture of steam and air used for injecting the beads into the expander there was a temperature differential of some one to three degrees between the relatively hot lower portion of the expander and the relatively cool upper portion of the expander wherefore a relatively small change in the temperature at the lower portion of the expander did not result in a change in the bulk density of the expanded beads passing out of the expander until most of the theoretical ten to fifteen minutes residence time of the beads in the expander had passed. For example, if the temperature in the lower portion of the expander was 180° F. and the temperature in the upper portion of the expander was 178° F. one degree rise in the temperature at the lower portion of the expander would only increase the temperature at the upper portion to 179° F. But the beads at the upper portion of the expander had already been exposed to 180° F. in the lower portion of the expander and therefore were relatively unaffected by a change from 178° F. to 179° F. at the upper portion of the expander and conversely, going down in temperature. The introduction of the mixture of steam and air in the upper portion of the expander reduces the response time from the previous ten to fifteen minutes to one to two minutes. In attempting to increase bead density by reducing temperature it is desirable to have a minimal amount of material exposed to the "too high" temperature so that a backdown in temperature and consequent increase in bulk density may be accomplished with the fastest change in production coming out of the expander.

A mixture of steam and air may be employed for injecting the raw beads, i.e., the impregnated beads, prior to expansion thereof in the expander. The raw beads may be introduced into a pipe 44 and may be injected into the expander by a mixture of steam and air from the pipe 43 passing through a pipe 45 and meet the pipe 44 at a venturi tube 46.

Thus I provide for rapidly, efficiently and automatically controlling the bulk density of expanded beads delivered from the expander for the molding of cups or other products. A substantially uniform bulk density of the expanded beads is maintained which results in unprecedented uniformity and quality of the molded products.

While I have shown and described a present preferred embodiment of the invention it is to be distinctly understood that the invention is not limited thereto but may be otherwise variously embodied within the scope of the following claims.

I claim:

1. Apparatus for controllably expanding expandable material comprising an expander through which the material passes, means for introducing an expanding medium consisting of a mixture of steam and air into the expander, said means including an air valve, means for determining the bulk density of the expanded material and means actuated by changes in the bulk density of the expanded material for adjusting the air valve to alter the proportion of air in the mixture to control the temperature of the expanding medium to produce expanded material of desired bulk density.

2. Apparatus for controllably expanding expandable material comprising a container, a source of expanding medium, means for introducing into the container material to be controllably expanded, means for delivering expanded material from the container, means for introducing expanding medium into the container at a location between the location of introduction of material into the container and the location of the means for delivering expanded material from the container, means for controlling the temperature of the expanding medium introduced into the container at a location between the location of introduction of material into the container and the location of the means for delivering expanded material from the container, means for determining the bulk density of the expanded material and means actuated by changes in the bulk density of the expanded material for controlling the temperature of the expanding medium introduced into the container at a location between the location of introduction of material into the container and the location of the means for delivering expanded material from the container.

3. Apparatus for controllably expanding expandable material comprising a container, a source of expanding medium, means for introducing into the container material to be controllably expanded, means for delivering expanded material from the container, means for introducing expanding medium into the container at a location between the location of introduction of material into the container and the location of the means for delivering expanded material from the container, means for controlling the temperature of the expanding medium introduced into the container at a location between the location of introduction of material into the container and the location of the means for delivering expanded material from the container and a movable agitator in the container agitating the material while it is being expanded, the agitator having a portion constituting a conduit through which expanding medium is introduced into the container at a location between the location of introduction of material into the container and the location of the means for delivering expanded material from the container.

4. Apparatus for controllably expanding expandable material comprising a container, a source of expanding medium, means for introducing into the container material to be controllably expanded, means for delivering expanded material from the container, means for introducing expanding medium into the container at a location between the location of introduction of material into the container and the location of the means for delivering expanded material from the container, means for controlling the temperature of the expanding medium introduced into the container at a location between the location of introduction of material into the container and the location of the means for delivering expanded material from the container, means for introducing expanding medium separate from material into the container at a location in the region of the location in which the material is introduced into the container, means for determining the bulk density of the expanded material, first means actuated by changes in the bulk density of the expanded material for controlling the temperature of the expanding medium introduced into the container at a location between the location of introduction of material into the container and the location of the means for delivering expanded material from the container and second means actuated by changes in the bulk density of the expanded material for controlling the temperature of the expanding medium introduced into the container at a location in the region of the location in which the material is introduced into the container.

5. Apparatus as claimed in claim 4 in which the first and second means are constructed and arranged to maintain a predetermined differential between the temperatures controlled thereby.

References Cited

UNITED STATES PATENTS

| | | | |
|---|---|---|---|
| 133,590 | 12/1872 | Dopp | 34—164 |
| 1,815,385 | 7/1931 | Wigelsworth | 34—46 |
| 2,768,629 | 10/1956 | Maul | 34—46 XR |
| 2,778,123 | 1/1957 | Kurtz | 34—173 XR |
| 3,023,175 | 2/1962 | Rodman | 259—8 XR |
| 3,131,034 | 4/1964 | Marsh | 34—191 XR |
| 3,262,686 | 7/1966 | Kraus et al. | 263—21 |

FREDERICK L. MATTESON, JR., *Primary Examiner.*

A. D. HERRMANN, *Assistant Examiner.*

UNITED STATES PATENT OFFICE
CERTIFICATE OF CORRECTION

Patent No. 3,378,245                             April 16, 1968

Alan I. W. Frank

It is certified that error appears in the above identified patent and that said Letters Patent are hereby corrected as shown below:

Column 3, line 26, "thhe" should read -- the --. Column 4, line 10, "expand" should read -- expanded --; line 53, "4" should read -- 24 --. Column 5, line 11, "the" should read -- be --.

Signed and sealed this 12th day of August 1969.

(SEAL)
Attest:

Edward M. Fletcher, Jr.                          WILLIAM E. SCHUYLER, JR.
Attesting Officer                                     Commissioner of Patents